United States Patent [19]

Leary

[11] Patent Number: 5,105,741

[45] Date of Patent: Apr. 21, 1992

[54] PORTABLE EQUIPMENT HANDLING APPARATUS

[76] Inventor: Duane Leary, 3162 Vegas Valley Dr., Las Vegas, Nev. 89121

[21] Appl. No.: 596,787

[22] Filed: Oct. 12, 1990

[51] Int. Cl.⁵ .............................................. E01B 5/02
[52] U.S. Cl. ................................... 104/106; 104/183; 238/10 R; 238/134
[58] Field of Search ................. 104/183, 91, 106, 170, 104/171, 165, 172.1, 173.1, 173.2, 174, 94, 177, 178; 238/10 R, 10 A, 10 F, 127, 134, 135, 166, 176

[56] References Cited

U.S. PATENT DOCUMENTS

| | | | |
|---|---|---|---|
| 981,613 | 1/1911 | Carter | 238/10 R X |
| 1,194,819 | 8/1916 | Clark | 238/10 R X |
| 1,455,293 | 5/1923 | Kolling et al. | 238/10 R |
| 2,107,465 | 2/1938 | Borggaard | 104/171 |
| 2,952,411 | 9/1960 | Hand | 238/10 R |
| 3,216,369 | 11/1965 | McKinney | 104/183 X |
| 3,532,058 | 10/1970 | Meide | 238/10 R X |
| 4,502,628 | 3/1985 | Sarantitis | 238/10 R X |
| 4,528,711 | 7/1985 | Packer | 238/10 R X |
| 4,597,615 | 7/1986 | Steger | 238/127 X |
| 4,972,778 | 11/1990 | Suominen | 104/183 |

OTHER PUBLICATIONS

Greenlee Catalog, Greenlee Textron Inc., no date, pp. 55-80.

Primary Examiner—Margaret A. Focarino
Assistant Examiner—Joseph D. Pape
Attorney, Agent, or Firm—Quirk, Tratos & Roethel

[57] ABSTRACT

A portable equipment handling apparatus comprises a track assembly that can be laid out in any desired configuration throughout a manufacturing plant, on a construction site or other desired facility. A movable platform is mounted on the track assembly and receives the equipment or supplies that are to be moved through the facility from an old location to a new location. The tugger puller is secured at the new location and the movable platform is loaded with the equipment or supplies at the old location. The activation of the tugger puller pulls the movable platform from the old location, along the track assembly, to the new location at which the equipment or supplies can be offloaded from the movable platform, if desired. The track assembly can include straight and curved segments to allow the track to be laid out in the desired path. The track can be disposed along floors, up and down stairs, along vertical walls and across ceilings. The joints between segments of the track assembly are two-way joints allowing the track assembly to bend either acutely or obtusely. The movable platform is provided with rollers designed to cooperate with the track cross section to mitigate the movable platform disengaging from the track during use. The movable platform also includes a braking device of the "dead man" type in the event of malfunction and to prevent inadvertent movement of the platform.

20 Claims, 8 Drawing Sheets

PORTABLE EQUIPMENT HANDLING APPARATUS

This invention relates to a portable equipment handling apparatus, and more particularly to a portable equipment handling apparatus having a portable track system so that pieces of equipment or supplies can be relocated at the desired locations in the workplace.

BACKGROUND OF THE INVENTION

In a typical manufacturing plant, it is often necessary to relocate pieces of equipment or supplies. Much of this equipment or supplies is too heavy to be carried by the plant personnel. The conventional solution to this problem is to utilize a forklift to lift and carry the equipment or supplies from the old location to the new location. A forklift has the disadvantage of only having a pair of forks on which the equipment or supplies to be moved must be balanced during the transport of the equipment or supplies from the old location to the new location. If the equipment or supplies are in any way irregular in shape or weight distribution, it can be quite precarious to try and relocate the equipment or supplies by using a forklift. The forklift operator is potentially at risk if the weight of the equipment or supplies shifts during movement and the forklift turns over.

The forklift has the additional disadvantage of requiring operating room to move around. There must be sufficient space for the forklift to twist and turn in and around any structures or equipment that lies in the route between the old location and the new location. It is often desirable to relocate equipment or supplies to different floors of a building and forklifts are just not functional for going up and down stairs.

Other devices have been utilized for the relocation of equipment or supplies about a workplace. Wheeled transportation carts, either motorized or manual, have been suggested but the weight of the equipment or supplies that can be relocated is limited to that weight which can be accommodated by the cart and the weight that can be transported by the motor driving the cart or the personnel pushing or pulling on the cart.

If it is necessary to relocate the equipment or supplies over irregular terrain or to different floors or levels of a building or storage or work area, wheeled transportation carts are virtually useless. The forklift again has some practicality in this situation, but if stairs are involved, the forklift becomes ineffective. With this problem in mind, many facilities have had to go to the expense of building elevators so that forklifts can be driven from floor to floor. The addition of elevators adds to the overall expense of the construction and operation of the facility and takes useful operational space out of service. Heavy electrical equipment must be moved into place in a new building or on a construction site before power is available to operate an elevator.

It is an object of the present invention to provide an apparatus that is useful in relocating equipment or supplies from an old location in a manufacturing plant, construction site or similar workplace regardless of whether the equipment or supplies is irregular or regular in shape or weight and regardless of whether confined areas are involved or whether the equipment or supplies must be moved over irregular terrain or between different floors of a building or structure.

It is a feature of the present invention to provide a portable equipment or supplies handling apparatus comprising a track assembly, a movable platform and a tugger-puller. The track assembly is laid out along the path through the facility from the old location to the new location at which it is desired to relocate the equipment or supplies. The movable platform is mounted on the track assembly and is designed to receive the equipment or supplies that are to be moved. The tugger puller is secured at the new location and the activation of the tugger puller pulls the movable platform from the old location, along the track assembly, to the new location at which the equipment or supplies can be offloaded from the movable platform, if desired. The apparatus of the present invention is quite portable. A set of track sections, the movable platform and the tugger puller can all be loaded into a gang box and transported to the location at which it is to be used. After use, the entire apparatus can be disassembled, placed back into the gang box and stored for later use.

It is an advantage of the present invention that equipment or supplies can be relocated from an old location to a new location through any type of terrain or up and down stairs or to any desired levels in a building or structure by utilizing the same equipment and the necessity of using and maintaining forklifts or elevators is eliminated. The track sections of the present invention can be oriented along a flat floor, up and down stairs, up the side of a wall and even across a ceiling due to the configuration of the track.

SUMMARY OF THE INVENTION

A portable equipment handling apparatus comprises a track assembly comprising a plurality of interlocking track sections that can be laid out in any desired configuration throughout a manufacturing plant, construction site or other facility. A movable platform is mounted on the track assembly and is designed to receive the equipment or supplies that are to be moved through the manufacturing plant or facility from an old location to a new location. The tugger puller is secured at the new location and the movable platform is loaded with the equipment or supplies at the old location. The activation of the tugger puller pulls the movable platform from the old location, along the track assembly, to the new location at which the equipment or supplies can be offloaded from the movable platform, if desired.

The track assembly can include track sections designed as straight segments, curved segments and intersection segments to allow the track to be laid out in the desired path through the manufacturing plant or facility from the old location to the new location. The structural configuration of the track assembly allows the track to be disposed along floors, up and down stairs, along vertical walls and even across ceilings thus eliminating the need for elevators to move the equipment and supplies between different floors of the manufacturing plant or facility. The joints between segments of the track assembly are two-way joints allowing the track assembly to bend either acutely or obtusely. The track segments are easily connectable and easily secured to the floor of the manufacturing plant or facility.

The movable platform is provided with rollers designed to cooperate with the track cross section to mitigate the movable platform disengaging from the track during use. The movable platform also includes a braking device to prevent inadvertent movement of the platform and the braking device can be of the "dead man" type in the event of malfunction of the tugger puller.

The preferred tugger puller is a conventional cable puller that can supply the necessary power to move a heavily loaded platform along the track assembly. The use of a generator-powered tugger puller allows the apparatus to be used on construction sites which do not have power supplied to the buildings. The tugger puller is mounted on a supporting structure so that the tugger puller can be located at the appropriate position at the new location to pull the movable platform along the track assembly to deliver the equipment or supplies to the new location.

DETAILED DESCRIPTION OF THE PREFERRED EMBODIMENTS

Figure 1:
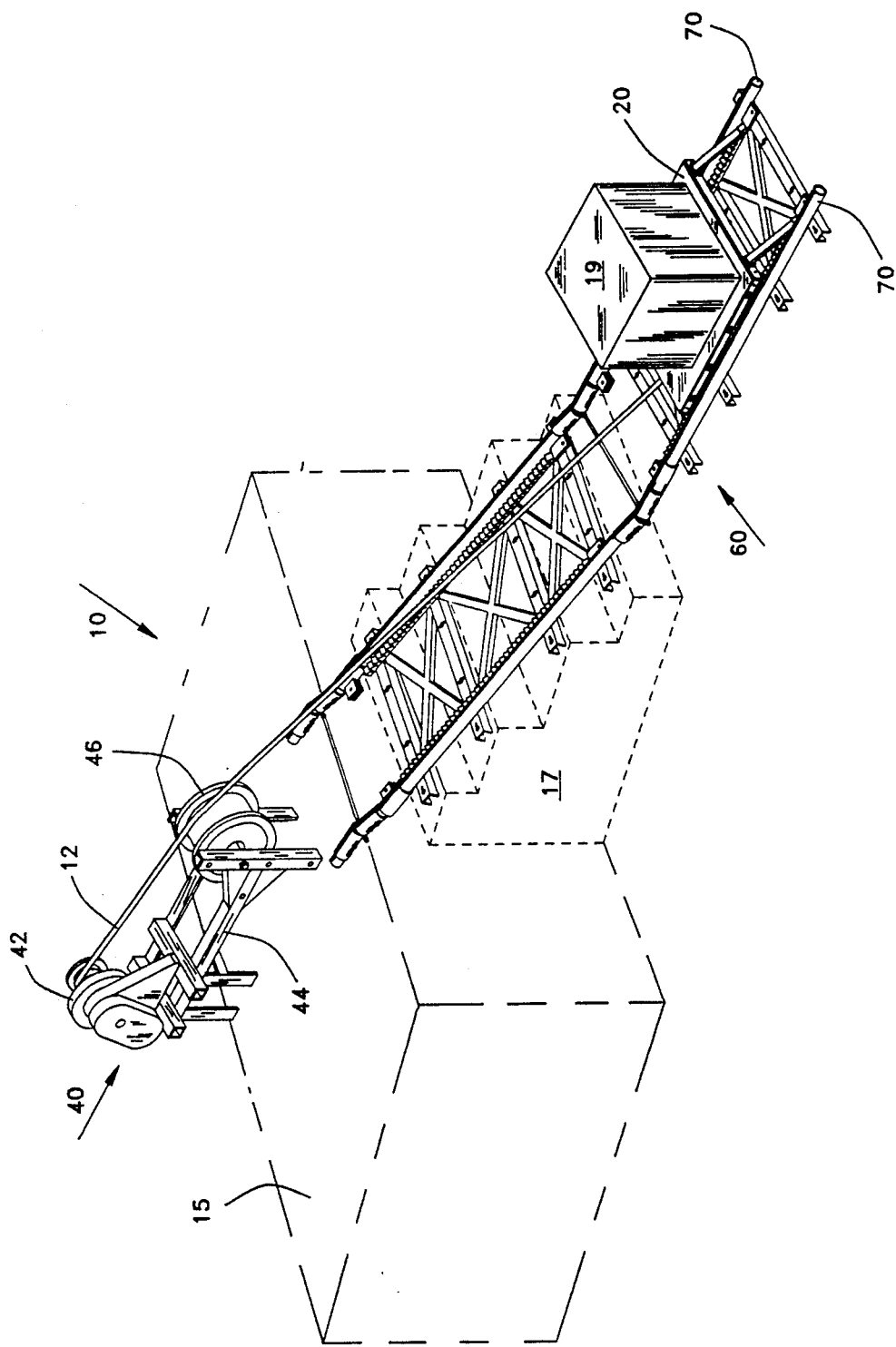
FIG. 1 shows a perspective view of the portable equipment handling apparatus of the present invention disposed to transport equipment up stairs to a storage area.

The portable equipment handling apparatus of the present invention is shown generally at 10 in FIG. 1. The portable equipment handling apparatus 10 comprises a movable platform mounted for rolling movement along a track assembly 60. The movable platform 20 is operably associated with a tugger puller assembly 40 by means of a cable 12 which has one end attached to the movable platform 20 and the other end attached to the tugger puller assembly 40.

As shown in FIG. 1, the tugger puller assembly 40 comprises any conventional tugger puller device such as a cable puller 42. In the preferred embodiment of the present invention, cable pullers made by Greenlee Textron, Inc., 4455 Boeing Drive, Rockford, Ill. 61109 can be used. The Model 640 Tugger, having a 4000 pound pulling force, or Model 6001, having a 6500 pound pulling force, both made by Greenlee Textron, Inc. would be quite suitable for the present invention. The cable puller 42 is mounted on a support stand 44 of any suitable configuration depending upon the orientation of the cable puller. There are a plethora of support stands that are known in the art and are used to support cable pullers. Also mounted on the support stand 44 is a conventional cable sheave 46.

Any suitable cable material can be used for cable 12. In connection with the Greenlee Textron, Inc. cable pullers suggested for the preferred embodiment, either 9/16" or 1" double braided polyester composite rope, also made by Greenlee Textron, Inc., is the preferred cable material. Suitable cable pullers, support stands, cable sheaves and cables are shown at pages 55-80 of the Greenlee ® catalog, which is incorporated herein by this reference thereto.

The track assembly 60 is laid out through a manufacturing plant, construction site or other facility from one location at which equipment or supplies is presently stored or located to a second location at which the equipment or supplies is desired to be relocated. As shown in representation in FIG. 1, the second location is an elevated location 15, raised above the normal ground or floor level of the plant.

The track assembly 60 is laid out so that one end of the track assembly 60 is disposed on top of the elevated location 15. The other end of the track assembly 60 lies on the floor and the central portion of the track assembly 60 rises up a set of stairs 17. The tugger puller assembly 40 is mounted on top of the elevated location 15 so that the motive force from the tugger puller 40 through the cable 12 will pull the movable platform 20 along the track assembly 60, up the stairs 17 and onto the top of the elevated location 15 to deliver the equipment or supplies 19 on the movable platform 20 to the elevated location 15.

Figure 2:
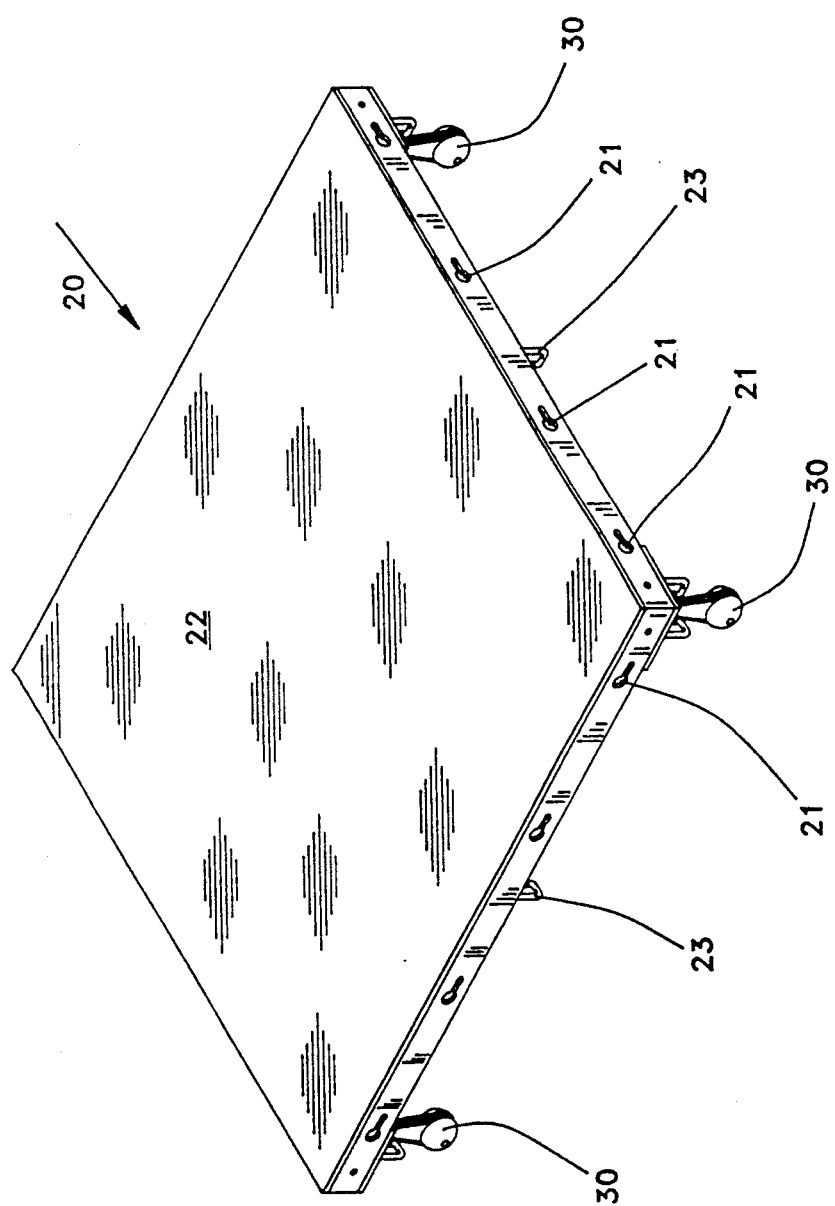
FIG. 2 shows a perspective view of the movable platform of the present invention.

FIG. 2 shows a perspective view of the movable platform 20. A generally rectangular surface functions as the platform base 22 of the movable platform 20 and provides the appropriate loading area upon which the equipment or supplies to be transported can be placed. A plurality of hooks 23 are disposed around the underside perimeter of the platform base 22 to provide means for tieing down the equipment or supplies to more securely hold them to the platform base 22 during movement of the movable platform 20. The hooks 23 also function as the attachment location for connecting the cable 12 to the platform 20. On each lateral edge of the platform base 22 there are provided a plurality of key hole slots 21 which function to permit attachment of the "dead man" brake device as will be described herein.

Also on the underside of the platform base 22 there are provided a plurality of rollers 30, preferably one at each corner of the platform base 22. Each roller 30 rides inside the tubular tracks 70 on the track assembly 60.

Figure 3:
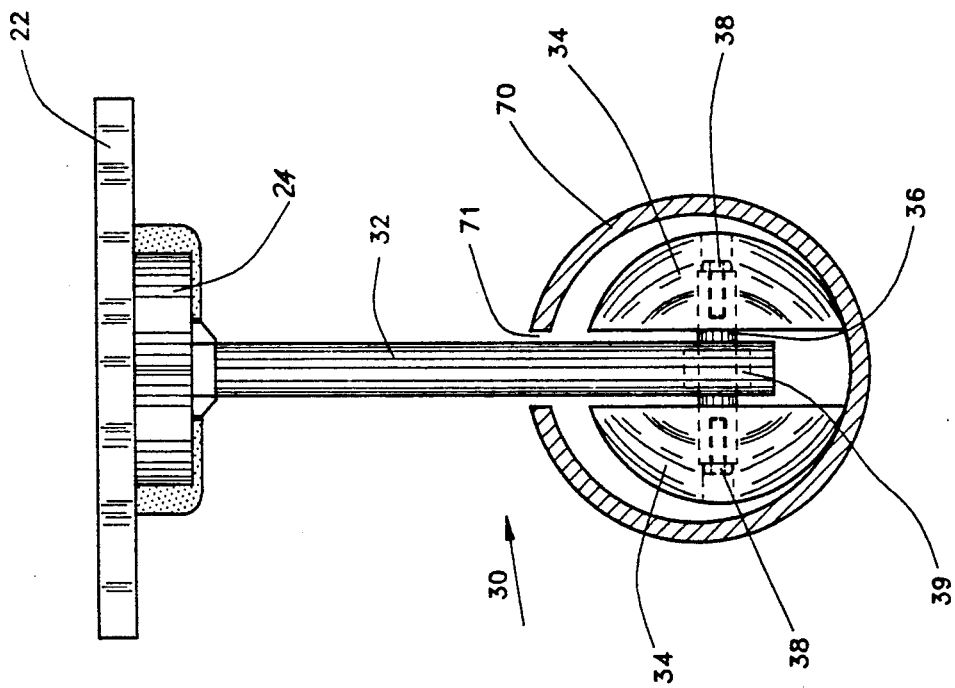
FIG. 3 shows a detailed view of a roller mounted on the movable platform of the present invention.

Each roller 30 is connected to the platform base 22 by means of a thrust bearing 24, shown in more detail in FIG. 3. The roller 30 has a depending mounting arm 32 which is of a generally round cross section so that the mounting arm 32 will not catch or snag on the opening 71 of the tubular track 70. At the lower end of the mounting arm 32, an axle 36 is mounted in a roller bearing 39. A half wheel 34 is attached by means of a retainer bolt 38 to each end of the axle 36.

At the top of the tubular track 70, there is provided an opening 71 to accommodate the mounting arm 32 on the roller 30. This configuration allows rolling movement of the roller 30 through the tubular track 70 and the curved outer surface of each half wheel 34 keeps the roller 30 inside the tubular track 70.

Figure 4:
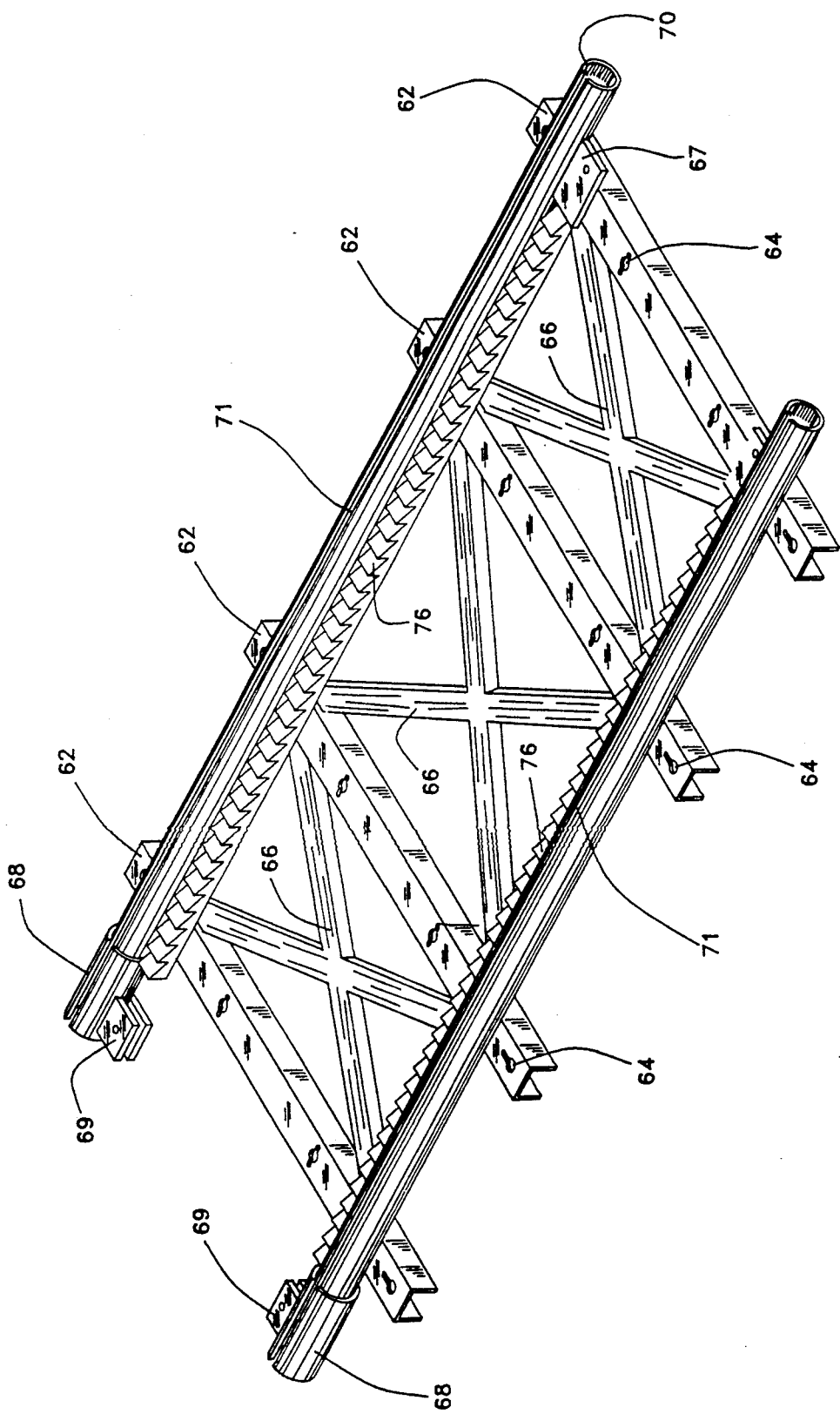
FIG. 4 shows a perspective view of a representative segment of the track assembly of the present invention.

FIG. 4 shows the details of a representative segment of the track assembly 60. The track assembly 60 shown in FIG. 4 is a generally straight segment of track. Alternatively, as desired the track assembly 60 can be made of any suitable numbers of straight segments and curved segments so that when the various segments are joined together, the track assembly 60 will follow the desired path through the manufacturing plant, construction site or other facility.

As shown in FIG. 4, in the preferred embodiment of the present invention, two parallel tubular tracks 70 are mounted the appropriate distance apart to accommodate the spacing of the roller 30 on the underside of the movable platform 20. The track assembly 60 also includes a plurality of tie down beams 62 attached to the underside of the tubular tracks 70 and designed to provide the mounting base for each segment of the track assembly 60.

Each tie down beam 62 is provided with a plurality of keyhole slots 64 through which bolts or other suitable fastening devices can be inserted to fasten each tie down beam 62 to the floor of the manufacturing plant, construction site or other facility. If the segment of the track assembly 60 is being attached to a structure such as the stairs 17 shown in FIG. 1, chains can be looped around the open stair wells and fastened to the tie down beams 62 by means of the keyhole slots 64.

In order to improve the structural strength of the tubular track 70, one or more cross braces 66 are provided between the tubular tracks 70 and the tie down beams 62.

Figure 6:
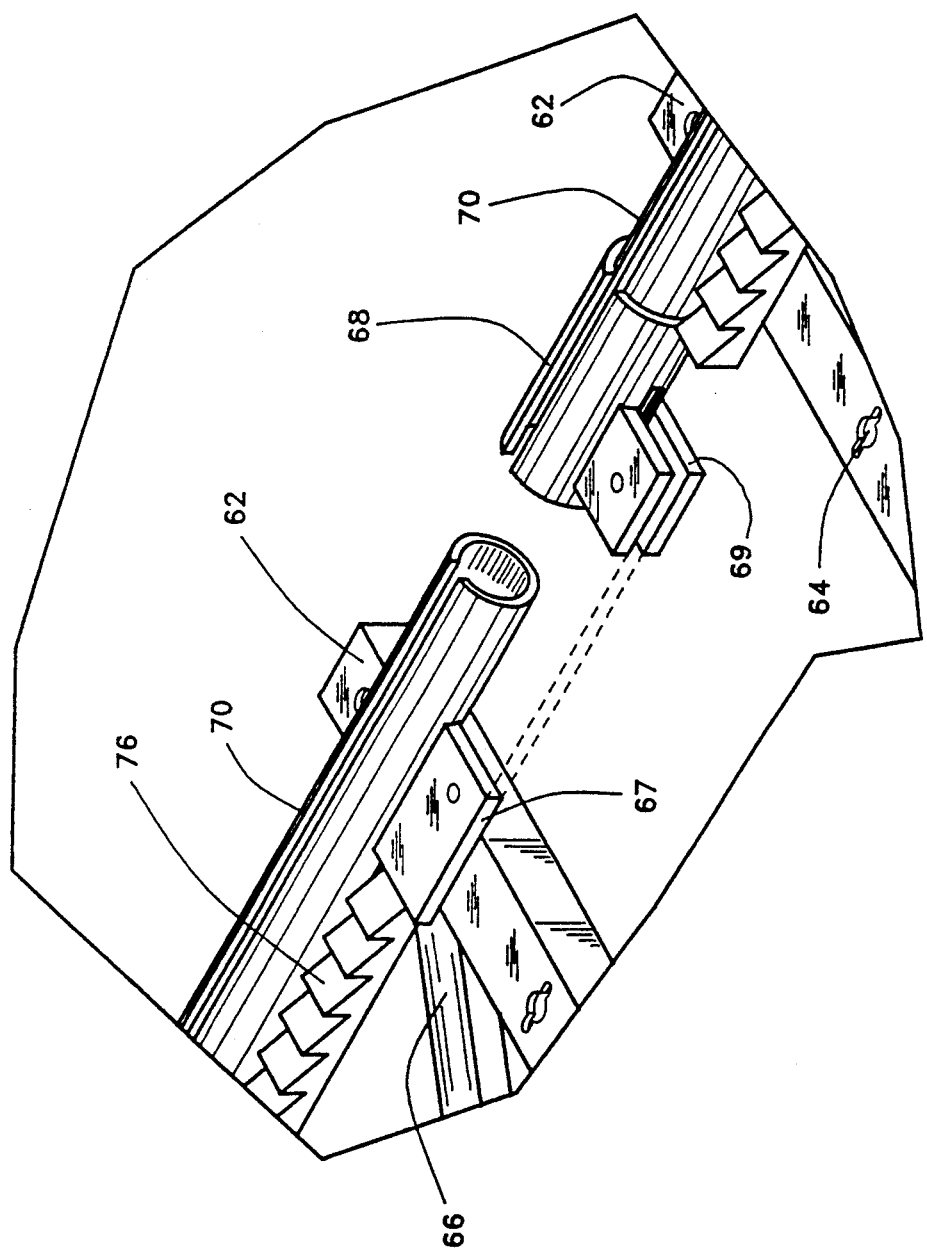
FIG. 6 shows a detailed view of a connection of two adjoining track segments of the track assembly of the present invention.

As shown in FIG. 6, at one end of each individual segment of the track assembly 60, a single hitch plate 67 is provided. The single hitch plate 67 has a central aperture as shown. At the other end of each individual segment of the track assembly 60, a double hitch, plate 69 is provided. The double hitch plate 69 also has a central aperture as shown. When one track segment is to be joined to an adjacent track segment, the single hitch plate 67 is lined and disposed between the double hitch plate 69 and a pin is inserted through the central apertures. At the end of the track segment that has the double hitch plate 69, the tubular track 70 is provided with a flared coupling 68 so that the tubular track segments 70 can overlap and slide together.

Figure 7:
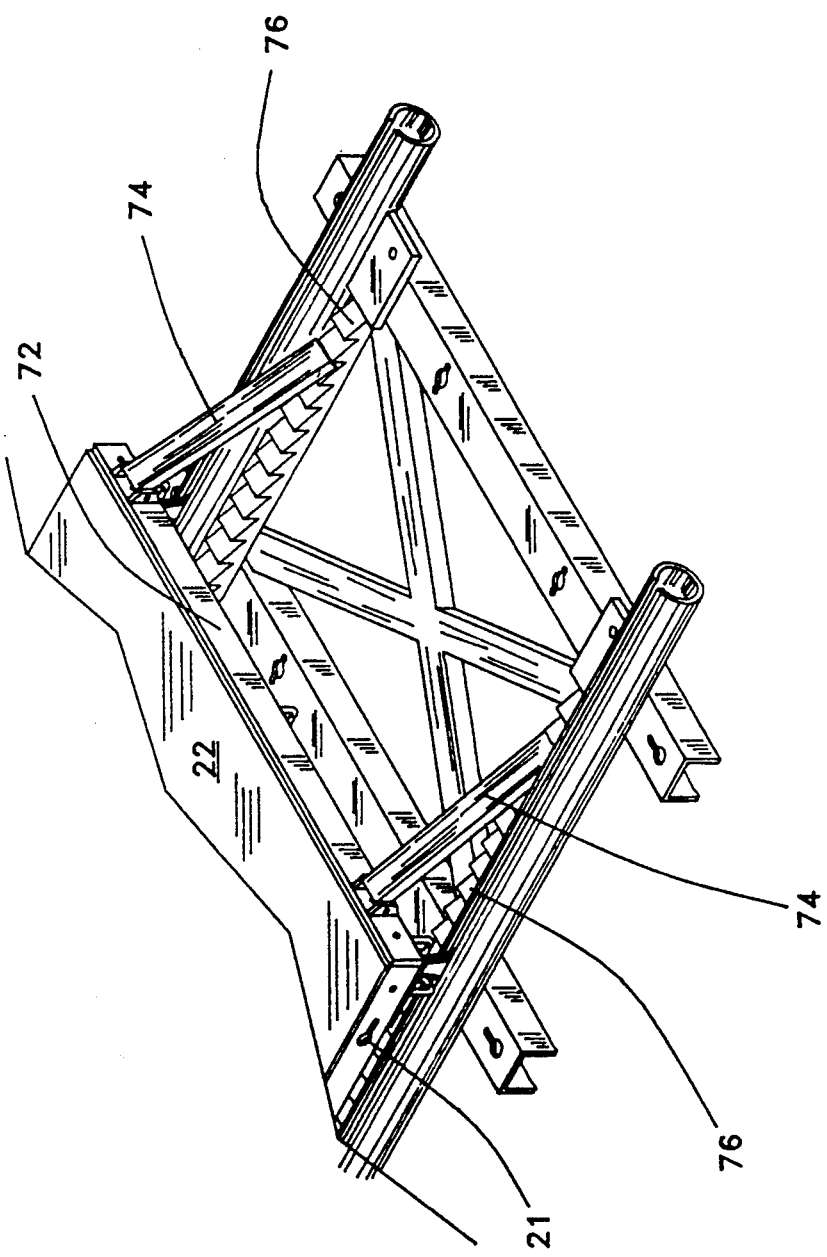
FIG. 7 shows a detailed view of the movable platform provided with the "dead man" braking system of the present invention.

FIG. 7 shows the "dead man" braking system used in conjunction with the present invention. The braking system comprises a mounting plate 72 disposed along the edge of one of the sides of the platform base 22. On the back side of the mounting plate 72 (not shown) there are provided a series of bolts designed to engage the keyholes slots 21 on the lateral edges of the platform base 22. Thus, regardless of the orientation of the platform base 22, the mounting plate 72 can be attached to the appropriate lateral edge of the platform base 22 so that the braking system will be properly oriented to work with the track assembly 60. The braking track 76 is attached along an inner surface of the tubular track 70.

At each approximate end of the mounting plate 72, there is provided a brake arm 74 designed to engage into one of a series of teeth in a braking track 76. Each brake arm 74 is spring biased downwardly to be in operative engagement with the braking track 76 when the platform 22 is at rest. When the platform is being pulled forward by the tugger puller, each brake arm 74 will ride along the teeth in the braking track 76 and these teeth will not interfere with the forward movement of the platform 22. In the event power is lost to the platform 22 (such as if the cable 12 should break), the platform 22 will be prevented from moving backward down the track assembly 60 due to the action of the brake arms 74 engaging the teeth in the braking track 76.

Figure 5:
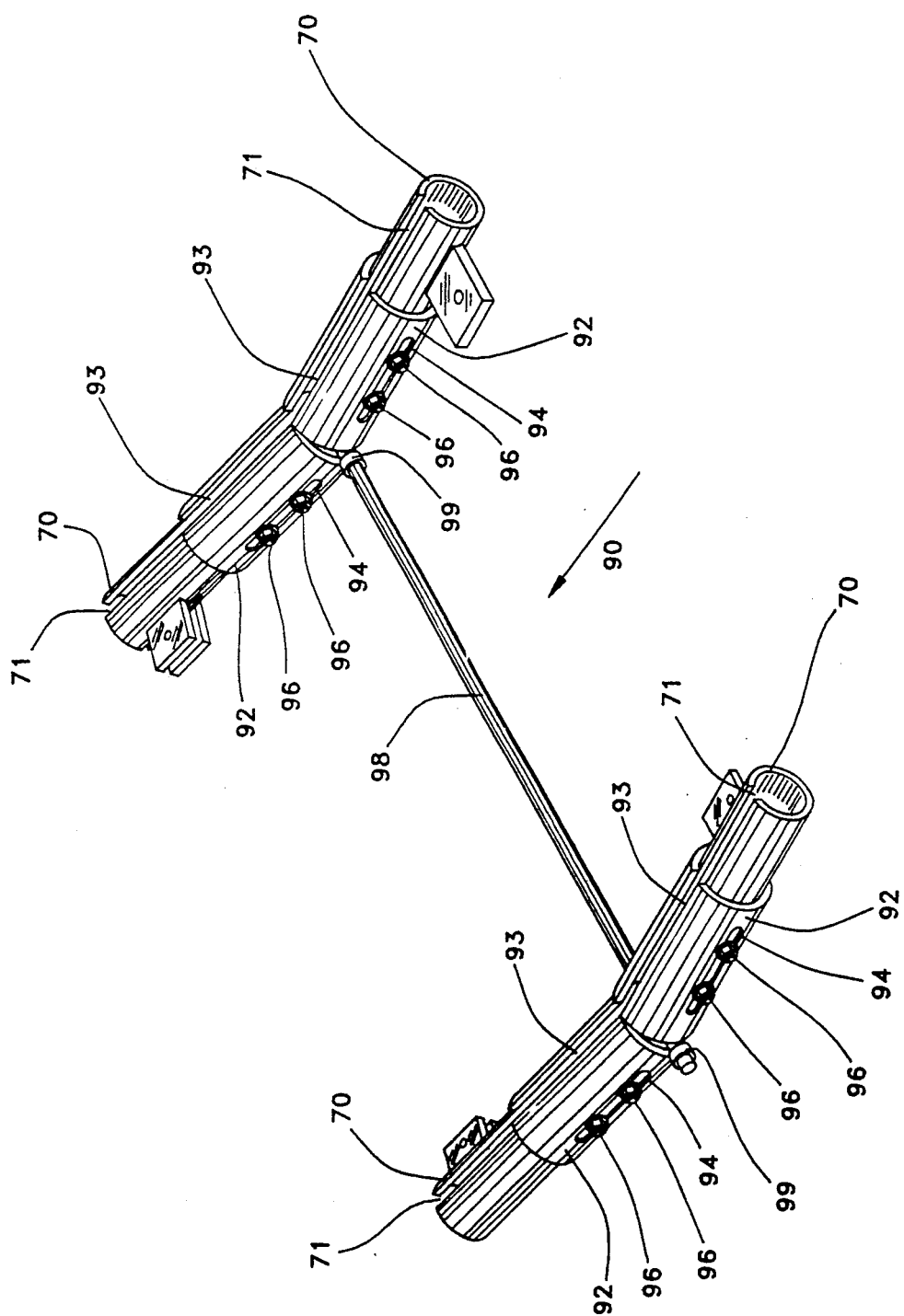
FIG. 5 shows a detailed view of a joint connecting segments of the track assembly of the present invention.

FIG. 5 shows the details of a connecting joint 90 used between adjoining segments of the track assembly 60 when it is necessary to have the track assembly 60 change vertical direction. This connecting joint 90 allows the track assembly 60 to go up and down in elevation so that the track assembly 60 can be used on stairs or over irregular terrain.

When it is desired to provide a pivot point between two adjoining track segments, the connecting joint 90 is fastened to the ends of the tubular track segments 70. A sleeve segment 92 on the connecting joint 90 slides over the end of the tubular track 70 and fastens by means of single and double hitches in the same manner as two adjacent flat track segments are connected. Each sleeve segment 92 is provided with an adjustment slot 94 that accommodates a pair of tightening bolts 96. The adjustment slot 94 allows lateral positioning of the sleeve 92 relative to the end of the tubular track 70. The ends of each sleeve segment 92 may be beveled to allow the sleeve segments 70 to pivot and still keep the sleeve segments close enough to each other so that the roller 30 on the bottom of the movable platform 20 will not jump out of the track 70.

Once the desired angle of bend of the track assembly 60 is selected, at either an obtuse or acute angle, each sleeve 92 is slid into contact with the adjacent sleeve 92 to close any gap between the slot openings 93 in order to inhibit the rollers 30 on the movable platform 20 from jumping out of the tubular track 70 when the movable platform 20 passes through the connecting joint 90. The tightening bolts 96 are tigthened to hold the sleeves in place in the desired location. A reinforcing bar 98 is mounted between the parallel tubular tracks 70 in order to support the connecting joint 90 between the tubular tracks 70. Each end of the reinforcing bar 98 is connected to a hinge 99 mounted on the underside of the edges of the adjacent sleeves 92. This hinge 99 allows the connecting joint to pivot either acutely or obtusely.

Figure 8:
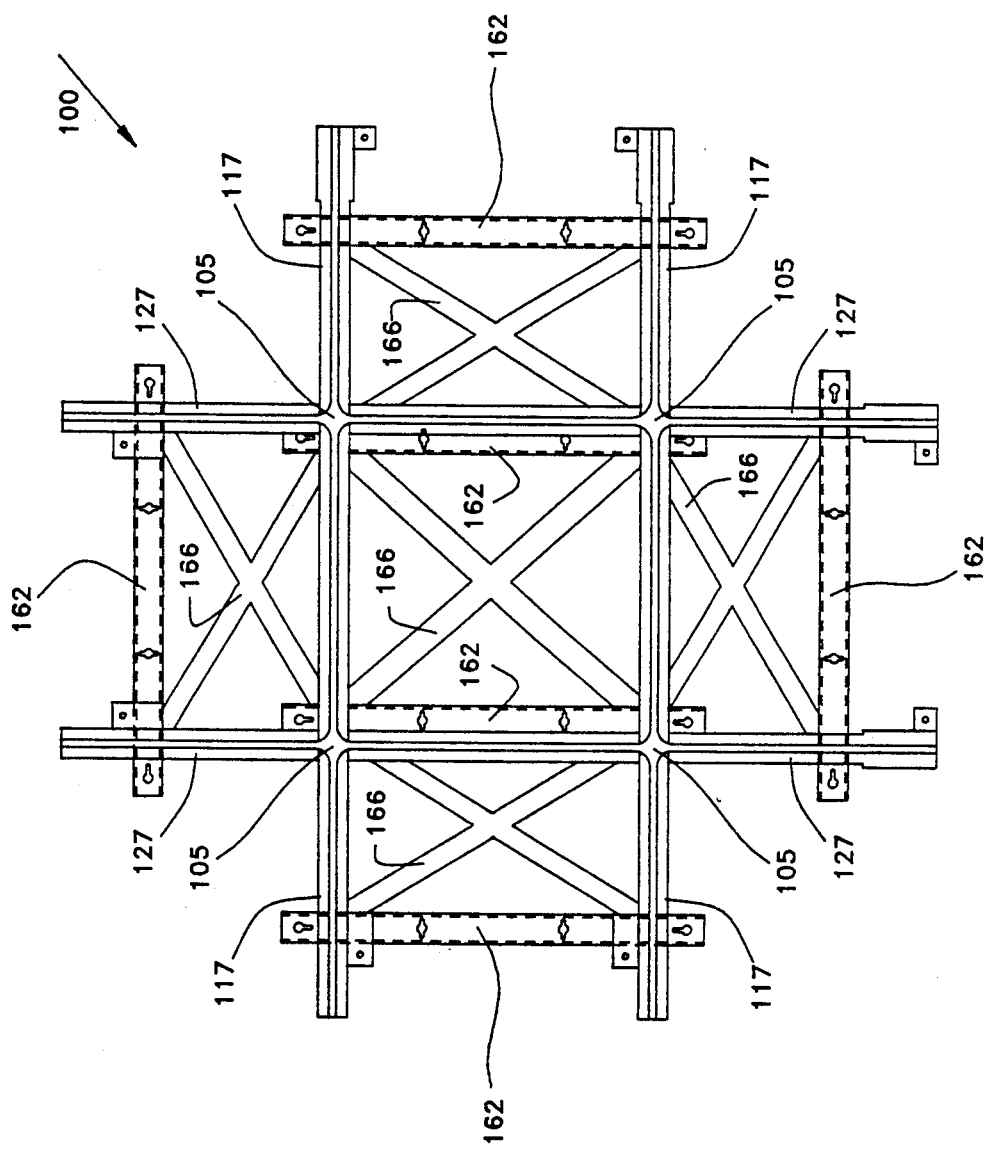
FIG. 8 shows a top view of an intersection segment of the track assembly of the present invention.

FIG. 8 shows a track segment useful in the present invention when it is desired to effect a 90° change in the track direction. This track segment 100 forms an intersection between two 90 track segments. The east-west tracks 117 intersect with the north-south tracks 127 at four track intersections 105. (For purposes of reference, directions have been used with north being toward the top of FIG. 8). Appropriate tie down beams 162 and cross braces 166 are provided. In addition, a braking track 76 may be included in the track segment 100, if desired.

If a movable platform 20 approaches the intersection segment 100 from the east and is to be redirected to the north, it is a simple matter to manually direct the movable platform 20 through the track intersections 105 to the desired direction. When the direction of movement of the movable platform 20 changes, it then becomes necessary to relocate the braking mounting plate 72 (see FIG. 7) onto the appropriate lateral edge of the movable platform 20 so that the "dead man" braking system is operable in the new direction of movement of the movable platform 20.

The portable equipment handling apparatus 10 of the present invention can be utilized over any terrain or elevations encountered in manufacturing or assembly plants, construction sites or other buildings or facilities. The tugger puller assembly 40 can be mounted in any orientation, either vertical, horizontally or somewhere in between, depending on the direction of pulling desired. The appropriate use of sheaves also permits changing the direction of pulling effected by the tugger puller assembly 40.

Because of the tubular cross section of the track 70, the track 70 can be oriented with the wheel opening 71 at the top, at the side or at the bottom depending on whether the track 70 is laid along a floor, up the side of a wall or across a ceiling. The thrust bearing 24 which holds the roller 30 to the underside of the movable platform 20 will permit movement of the roller 30 regardless of the orientation of the movable platform.

It is contemplated that the portable equipment handling apparatus of the present invention will include a gang box in which the parts of the apparatus will be stored when not in use and which will be used to transport the parts to the location at which the apparatus will be assembled for use. The gang box will hold a tugger puller assembly, a movable platform and the desired number of track sections including straight sections, curved sections and intersections.

While the invention has been illustrated with respect to several specific embodiments thereof, these embodiments should be considered as illustrative rather than limiting. Various modifications and additions may be made and will be apparent to those skilled in the art. Accordingly, the invention should not be limited by the foregoing description, but rather should be defined only by the following claims.

What is claimed is:

1. A portable equipment handling apparatus for moving equipment through a facility along a desired path from an old location to a new location comprising:
   (a) a portable track assembly comprising a plurality of track segments connected together along a desired path,
   (b) each track segment comprising a pair of tubular tracks mounted in a spaced apart relationship along a plurality of tie down beams, the tie down beams being reinforced by a plurality of cross braces,
   (c) a movable platform mounted for movement on the portable track assembly,
   (d) the movable platform being generally rectangular in shape and having a roller mounted to an underside of the movable platform at each corner thereof, said roller being sized to ride in the tubular track,
   (e) a tugger puller assembly mounted at one end of the portable track assembly, the tugger puller being operatively joined to the movable platform by means of a cable.

2. The portable equipment handling apparatus of claim 1 wherein each track segment has a single hitch flange at one end and a double hitch flange at the opposite end so that, when adjoining track segments are connected, the single hitch interfits with the double hitch to secure the segments together.

3. The portable equipment handling apparatus of claim 2 wherein each hitch has a pin aperture therein so that a pin can be used to connect the adjoining track segments together.

4. The portable equipment handling apparatus of claim 1 wherein each tubular track is of a generally circular enclosed cross section to confine the rollers on the movable platform within the tubular track during use and each tubular track includes an opening in the tubular track to accommodate a mounting arm on the roller.

5. The portable equipment handling apparatus of claim 4 wherein each mounting arm has round edges to allow the mounting arm to move easily along the tubular track and not catch on the opening in the tubular track.

6. The portable equipment handling apparatus of claim 1 wherein each roller comprises a mounting arm having a roller bearing at one end thereof, a retainer bolt disposed through the roller bearing and a wheel half attached to each end of the retainer bolt by a retainer pin.

7. The portable equipment handling apparatus of claim 6 wherein each roller further comprises a thrust bearing attaching the mounting arm to the movable platform.

8. The portable equipment handling apparatus of claim 1 wherein each tie down beam has at least one keyhole slot for securing the tie down beam to a mounting surface of the facility.

9. The portable equipment handling apparatus of claim 1 further including:
   (a) a braking track mounted adjacent to the tubular track, said braking track including a plurality of teeth and
   (b) a braking device attached to the movable platform, the braking device including at least one braking arm
   whereby each braking arm will fall into a tooth on the braking track to stop the movable platform in the event of malfunction of the portable equipment handling apparatus.

10. The portable equipment handling apparatus of claim 9 wherein the braking device includes a mounting plate that can be removably attached to any lateral side of the movable platform.

11. The portable equipment handling apparatus of claim 1 wherein the portable track assembly comprises a plurality of straight segments and curved segments arranged to follow the desired path through the facility.

12. The portable equipment handling apparatus of claim 11 wherein the portable track assembly further includes at least one intersection segment.

13. The portable equipment handling apparatus of claim 1 wherein the tugger puller assembly includes a cable puller, a support stand and a sheave so that the tugger puller assembly can be mounted at any desired location in any desired orientation.

14. The portable equipment handling apparatus of claim 1 further including a connecting joint for joining two adjacent track segments together, the connecting joint including a reinforcing bar and a pair of laterally adjustable sleeves attached by means of a hinge to each end of the reinforcing bar whereby when the connecting joint is inserted between two adjacent track segments, the track segments can be pivoted up or down.

15. A portable equipment handling apparatus for moving equipment through a facility along a desired path from an old location to a new location comprising:
   (a) a portable track assembly comprising a plurality of track segments connected together along a desired path,
   (b) each track segment comprising a pair of tubular tracks, each tubular track being of generally circular enclosed cross section to confine rollers on a movable platform within the tubular track during use,
   (c) each track segment being mounted in a spaced apart relationship along a plurality of tie down beams, the tie down beams being reinforced by a plurality of cross braces, (d) each track segment further having a single hitch at one end and a double hitch at the opposite end so that, when adjoining track segments are connected, the single hitch interfits with the double hitch to secure the segments together, (e) a movable platform mounted for movement on the portable track assembly, (f) the movable platform being generally rectangular in shape and having a roller mounted to an underside of the movable platform at each corner thereof, said roller being sized to ride in the tubular track, (g) each roller comprising amounting arm having a roller bearing at one end thereof, a retainer bolt disposed through the roller bearing and a wheel half attached to each end of the retainer bolt by a retainer pin, (h) a tugger puller mounted at one end of the portable track assembly, the tugger puller being operatively joined to the movable platform by means of a cable, (i) a braking track mounted adjacent to the tubular track, said braking track including a plurality of teeth, and (j) a braking device attached to the movable platform, the braking device including at least one braking arm whereby each braking arm will fall into a tooth on the braking track to stop the movable platform in the event of malfunction of the portable equipment handling apparatus.

16. The portable equipment handling apparatus of claim 15 wherein each hitch has a pin aperture therein so that a pin can be used to connect the adjoining track segments together.

17. The portable equipment handling apparatus of claim 15 wherein each roller further comprises a thrust bearing attaching the mounting arm to the movable platform.

18. The portable equipment handling apparatus of claim 15 wherein each tie down beam has at least one keyhole slot for securing the tie down beam to a floor surface of the facility.

19. The portable equipment handling apparatus of claim 15 wherein the portable track assembly comprises a plurality of straight segments and curved segments arranged to follow the desired path through the facility.

20. The portable equipment handling apparatus of claim 15 further including a connecting joint for joining two adjacent track segments together, the connecting joint including a reinforcing bar and a pair of laterally adjustable sleeves attached by means of a hinge to each end of the reinforcing bar whereby when the connecting joint is inserted between two adjacent track segments, the track segments can be pivoted up or down.

* * * * *